United States Patent [19]
Thomas et al.

[11] Patent Number: 6,024,114
[45] Date of Patent: Feb. 15, 2000

[54] SOLENOID PILOT OPERATED AIR ACTIVATED PISTON DRIVEN DOUBLE SEAT ACCUMULATOR DRAIN VALVE

[75] Inventors: Ken E. Thomas, Mordialloc; Guiseppe Ragusa, Avondale Heights, both of Australia

[73] Assignee: General Pneumatics Pty. Ltd., Victoria, Australia

[21] Appl. No.: 08/765,779

[22] PCT Filed: Jun. 23, 1995

[86] PCT No.: PCT/AU95/00371

§ 371 Date: Jan. 15, 1997

§ 102(e) Date: Jan. 15, 1997

[87] PCT Pub. No.: WO96/02789

PCT Pub. Date: Feb. 1, 1996

[30] Foreign Application Priority Data

Jul. 15, 1994 [AU] Australia ............................. PM 6862

[51] Int. Cl.⁷ .............................. B08B 9/04; F16K 31/02; F16K 31/42
[52] U.S. Cl. ................... 137/244; 251/30.02; 251/30.05; 251/44
[58] Field of Search ............................. 251/30.01, 30.02, 251/30.04, 30.05, 44, 45, 46; 137/238, 242, 244

[56] References Cited

U.S. PATENT DOCUMENTS

| | | | |
|---|---|---|---|
| 2,710,162 | 6/1955 | Snoddy | 251/30.05 |
| 2,799,293 | 7/1957 | Clay | 251/30.05 |
| 2,956,728 | 10/1960 | Goepfrich et al. | 251/30.01 |
| 3,110,468 | 11/1963 | Herion | 251/30.05 |
| 3,171,439 | 3/1965 | Lansky et al. | 251/30.05 |
| 3,176,954 | 4/1965 | Cameron et al. | 251/30.02 |
| 3,329,392 | 7/1967 | Frantz | 251/30.01 |
| 4,081,171 | 3/1978 | Morgan et al. | 251/30.01 |
| 4,360,037 | 11/1982 | Kendall | 251/30.05 |
| 4,603,832 | 8/1986 | Sjoquist | 251/30.02 |

FOREIGN PATENT DOCUMENTS

| | | |
|---|---|---|
| A-0 153 503 | 9/1985 | European Pat. Off. . |
| 1263960-A1 | 10/1986 | U.S.S.R. . |
| A-1266996 | 3/1972 | United Kingdom . |
| A-1392500 | 4/1975 | United Kingdom . |
| A-1409023 | 10/1975 | United Kingdom . |
| A-2003258 | 3/1979 | United Kingdom . |
| WO 87/01174 | 2/1987 | WIPO . |
| WO 93/16309 | 8/1993 | WIPO . |

Primary Examiner—George L. Walton
Attorney, Agent, or Firm—Oliff & Berridge, PLC

[57] ABSTRACT

A drain valve has an inlet (36) for liquids and small solids, an accumulation chamber (37) and an outlet (17). The outlet has a seal (13) which is connected to an air-activated piston (12). The piston is in turn connected to a positive air pressure inlet (18) via an air communication path (19) and a closure (22). The closure (22) is opened by a closure activation means (29), causing positive air pressure to flow to the piston (12), which briefly causes the outlet seal (13) to be opened, allowing liquids and small solids from the accumulation chamber to be expelled. Upon de-activation by the closure activation means (29), the closure (22) recloses, blocking the supply of positive air pressure to the piston (12).

9 Claims, 2 Drawing Sheets

SOLENOID PILOT OPERATED AIR ACTIVATED PISTON DRIVEN DOUBLE SEAT ACCUMULATOR DRAIN VALVE

This invention relates to a drain valve. It relates particularly but not exclusively to a drain valve suitable for draining accumulated contaminants from the bottom of an air chamber in a compressed air system.

During the course of operation of compressed air systems such as air braking systems for large motor vehicles, contaminants such as oil and small solids typically accumulate at the bottom of one or more air reservoirs within the compressed air system. It is desirable that such contaminants be removed from the system as soon as possible, to reduce the likelihood of causing damage to the system.

Several different techniques are available for removing such contaminants. The simplest system involves providing a tap at the bottom of each air reservoir. At regular intervals, the compressed air system is deactivated, and the tap is opened, allowing contaminants to drain away. However, such a manual drain system does not allow for regular removal of contaminants and it relies upon a human operator to ensure that draining happens at regular intervals.

An automated method for draining contaminants involves providing an accumulation chamber at the bottom of the air reservoir, with an air supply tube leading to a governor valve on an air compressor system. When the air pressure in the air compressor system reaches a predetermined level, the governor valve sends a blast of air to activate a piston which briefly opens an outlet, allowing accumulated contaminants to drain from the accumulation chamber. This system is effective, but has the disadvantage that it relies upon a governor valve which is expensive and can be unreliable. In many compressed air systems, the compressor is only powerful enough to maintain a minimum level of air compression, with the result that the air pressure is never sufficient to activate the governor valve. Moreover, even in a compressed air system where the compressor is not under-capacity, the length of time taken to build up air pressure to a given level depends upon other loads on the system, with the result that activation of the governor valve may be irregular.

Another method involves the use of a solenoid valve linked to an electronic timer, such that the solenoid valve is opened at regular intervals, allowing contaminants to escape. However, solenoid valves typically operate only with small outlet openings, as a prohibitively large solenoid is required to activate a large closure for a large opening. As a result, solenoid valve openings rapidly become blocked with contaminants so that frequent maintennance is required.

An improved form of solenoid valve involves using the solenoid valve as a pilot valve which causes a larger valve to open. Such an arrangement typically comprises an inlet chamber and an outlet chamber, separated by a large valve. The inlet chamber is normally at higher pressure than the outlet chamber, causing the large valve to be closed. A small pilot passageway leads between the inlet and outlet chambers, and the passageway is normally closed by a solenoid valve. When the passageway is opened, the pressures in the inlet and outlet chambers become equal, causing the large valve to open. While this arrangement allows most of the accumulated contaminants to escape through the large valve opening, a proportion of the contaminants must still pass through the small pilot passage and the solenoid valve opening, and these passages frequently become blocked so that the unit requires maintenance.

According to the present invention, there is provided a drain valve including:

(a) a housing;
(b) an inlet in the housing for liquids and small solids;
(c) an accumulation chamber in the housing, for accumulating liquids and small solids;
(d) an outlet, through which liquids and small solids from the accumulation chamber can be expelled;
(e) a seal for the outlet;
(f) an air activated piston inside the housing movable between a first position and a second position, and connected to the outlet seal;
(g) a positive air pressure inlet;
(h) a passageway in the housing between the positive air pressure inlet and a secondary chamber;
(i) a closure in the secondary chamber for the positive air passageway;
(j) an air communication path between the secondary chamber and the piston; and
(k) closure activation means;

wherein, in operation, liquids and small solids accumulate in the accumulation chamber; the closure activation means opens the closure, causing positive air pressure to flow to the piston which moves from its first position to its second position and briefly causes the outlet seal to be opened allowing liquids and small solids from the accumulation chamber to be expelled; and upon de-activation by the closure activation means the closure recloses, blocking the supply of positive air pressure to the piston, and the piston returns to its first position.

The housing may be separable into two or more parts for maintenance purposes.

The inlet for liquids and small solids may be of any suitable size and shape. The inlet may optionally include a prefilter, in order to prevent large solids from entering the accumulation chamber and blocking the drain valve. An especially preferred type of prefilter is made from small sintered bronze balls.

The accumulation chamber may be of any suitable size and shape. It is preferred that the chamber be substantially cylindrical in order to accommodate the piston.

The piston may optionally be biased towards its first position by a biasing means. The biasing means may be any suitable biasing means. An especially preferred type of biasing means is a helical spring.

In a preferred arrangement, the piston causes the outlet seal to be opened briefly as the piston moves from its first position to its second position, and again to be opened briefly as the piston returns from its second position to its first position. The outlet preferably provides two seats for the seal, such that the outlet is closed when the seal is against either seat, but open when the seal is in between.

The closure activation means may be any suitable means for opening and reclosing the closure. It is especially preferred that the closure activation means comprise a solenoid in combination with an electronic timer.

The invention will hereinafter be described in greater detail by reference to the attached drawings which show an example form of the invention. It is to be understood that the particularity of those drawings does not supersede the generality of the preceding description of the invention.

Figure 1:
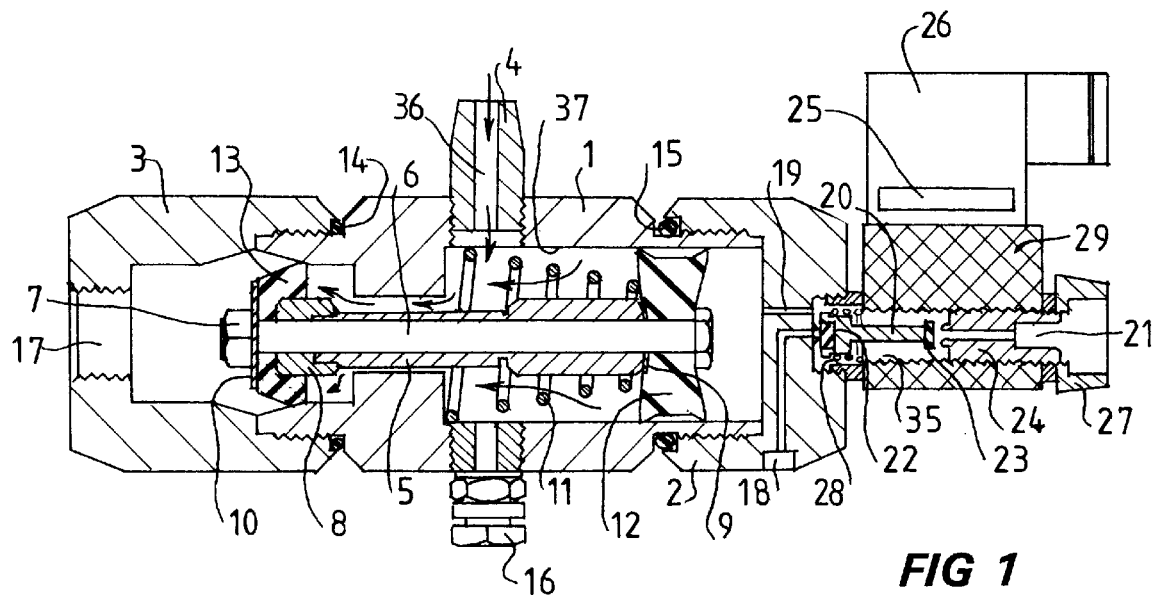
FIG. 1 is a cross-sectional side view of a drain valve according to an embodiment of the present invention with the closure closed and the piston in its first position.

The drain valve comprises an inlet 36 for liquids and small solids. Liquids and small solids accumulate in accumulation chamber 37, and they can be expelled from accumulation chamber 37 through outlet 17. In the embodiment illustrated, outlet 17 comprises a chamber defined between outlet end cap 3 and the left part of drain body 1. Inside walls of the chamber provide two seats for outlet seal 13, with the two seated positions of seal 13 being illustrated in FIGS. 1 and 3 respectively.

Piston 12 moves from a first position (shown in FIG. 1) to a second position (shown in FIG. 3), in a direction from right to left as illustrated in the drawings. Optional biasing means 11 retains piston 12 normally in the first position. However, because inlet 36 is normally connected to a greater-than-atmospheric pressure system, piston 12 may revert to its first position even without biasing means 11. Piston 12 is connected to, and operates, seal 13.

Positive air pressure inlet 18 communicates with closure 22. Extending between closure 22 and piston 12 is air communication path 19. When closure 22 is opened, positive air pressure from positive air pressure inlet 18 causes piston 12 to move against the force of biasing means 11 to its second position, so that seal 13 moves from one seat to the other within the outlet chamber, briefly opening the outlet so that liquids and solids in accumulation chamber 37 are expelled.

When closure 22 is reclosed, air exhaust port 21 opens, allowing air from air communication path 19 to escape, and thereby permitting biasing means 11 to restore piston 12 to its first position. During this reverse movement of the piston, seal 13 again moves between its two seats within the outlet chamber, briefly opening the outlet and allowing liquids and solids in accumulation chamber 37 to be expelled.

In the embodiment illustrated in the drawings, accumulation chamber 37 and air communication path 19 are housed within a single three-part housing comprising drain body 1, air inlet end cap 2, and outlet end 3. Outlet end 3 and air inlet end cap 2 are sealed to drain body 1 by means of O-rings 14 and 15 respectively, but can be removed for cleaning and maintenance.

Surrounding air inlet 36 is hex brass nipple or optional sintered bronze prefilter 4, which prevents large solids from entering accumulation chamber 37 and blocking the drain valve.

In the embodiment illustrated, bolt 6 extends through the centre of piston 12. Biasing means 11 which surrounds bolt 6 and spindle 5 comprises a helical spring. Spindle 5 fits into spindle collet 8, which in turn fits into outlet seal 13. Outlet valve seal 13 is fixed to bolt 6 by means of flat washer 10 and nut 7. Nut 7 is preferably a self locking nylon nut, and spindle 5 is preferably made from brass. Biasing means 11 acts against piston 12 via spring retaining washer 9. Piston 12 and outlet seal 13 may be made from any suitable materials. A particularly suitable type of material is viton rubber.

Supplementary drain cock 16 allows manual draining of the accumulation chamber for maintenance purposes.

Positive air pressure inlet 18 may be connected to any suitable positive air pressure supply line. In a typical compressed air system, several such suitable supply lines are available.

In the embodiment illustrated, air communication path 19 comprises an orifice through air inlet end cap 2 and also an extension of accumulation chamber 37, on the opposite side of piston 12 from accumulation chamber 37. Closure 22 is a pressure seal, and is attached in a fixed relationship with solenoid bolt 20. Spring 28 normally keeps closure 22 in the closed position. However, when closure activation means 29, which comprises a solenoid coil, is activated, solenoid bolt 20 is withdrawn and closure 22 is opened. Solenoid bolt 20 is held in its withdrawn position (illustrated in FIGS. 2 and 3) while the solenoid coil remains activated. Upon de-activation of solenoid coil 29, solenoid bolt 20 is restored to its former position and closure 22 is reclosed.

Solenoid coil 29 is activated every few minutes by electronic timer 25 which is connected to a power source by means of plug 26. The solenoid is held in position by retaining nut 27.

When closure 22 is reclosed, solenoid exhaust seal 23 moves away from sealing engagement with the mouth of outlet passageway 24, opening an air path between the air communication path 19 and air exhaust port 21, via exhaust channel 35.

The operation of the embodiment illustrated in the drawings will now be further explained by reference to the cycles of operation shown in FIGS. 1 to 4.

FIG. 1 shows piston 12 in its first position, with closure 22 closed, preventing the flow of air between positive air pressure inlet 18 and air communication path 19. Exhaust seal 23 is open, allowing air to pass freely from air communication path 19 to exhaust port 21.

Liquid and small solid contaminants enter accumulation chamber 37 through inlet 36 under the combined forces of gravity and air pressure. Outlet seal 13 presses against the internal walls of drain body 1, closing outlet 17.

Figure 2:
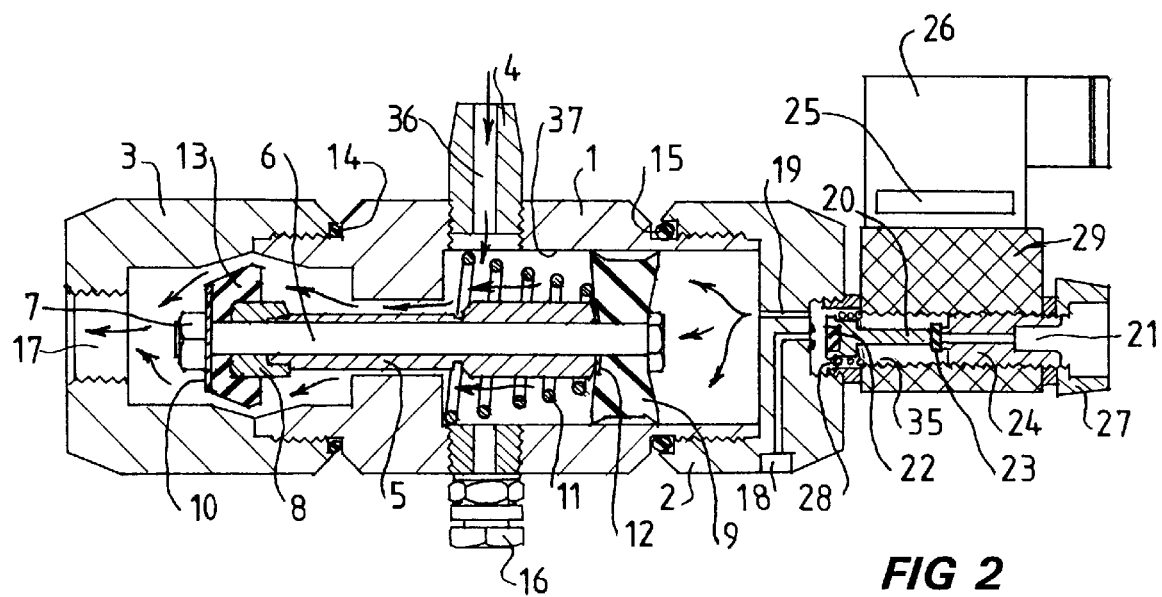
FIG. 2 shows the drain valve of FIG. 1 with the closure open and the piston moving towards its second position.

FIG. 2 shows the position instantaneously after closure activation means 29 has opened closure 22 in response to a signal received from electronic timer 25. Opening of closure 22 causes the closing of exhaust seal 23, so that communications between air communication path 19 and air exhaust port 21 are cut off at the same time as communications between the air communications path 19 and positive air pressure inlet 18 are opened. As a result, positive air pressure flowing through air communication path 19 acts on piston 12, causing piston 12 to move from right to left against the force of biasing means 11. Outlet seal 13 is thereby moved away from its first seat on the internal walls of drain body 1, allowing the accumulated liquids and small solids to be expelled through outlet 17.

Figure 3:
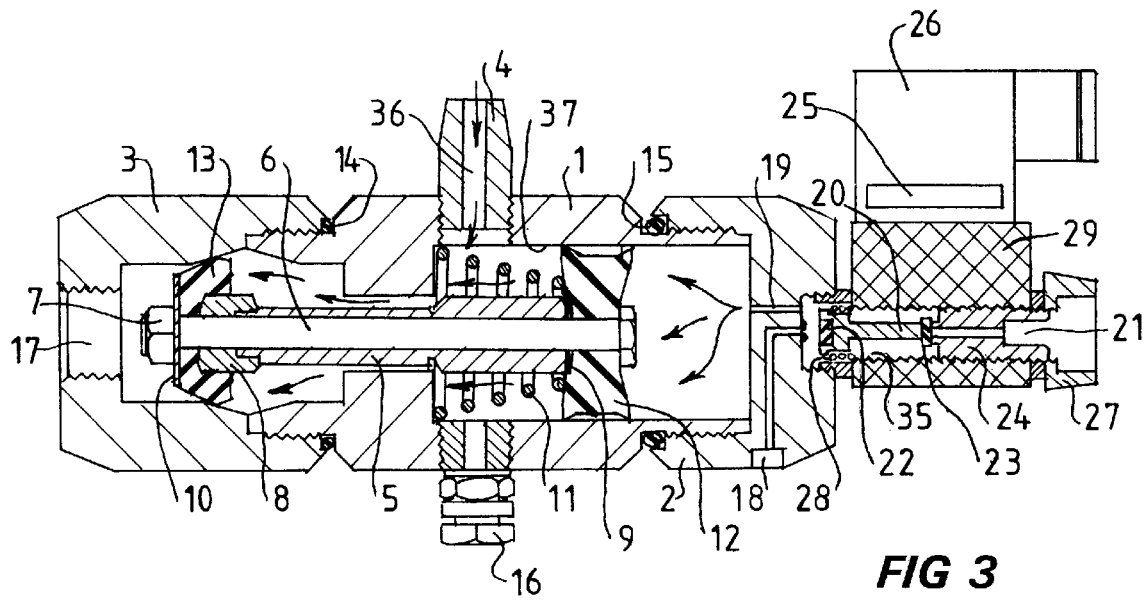
FIG. 3 shows the drain valve of FIG. 1 with the piston reaching its second position.

FIG. 3 shows the drain valve slightly later, with the piston having reached its second position. Outlet seal 13 now presses against its second seat on the internal walls of outlet end cap 3, preventing the escape of further liquids and solids through outlet 17.

Figure 4:
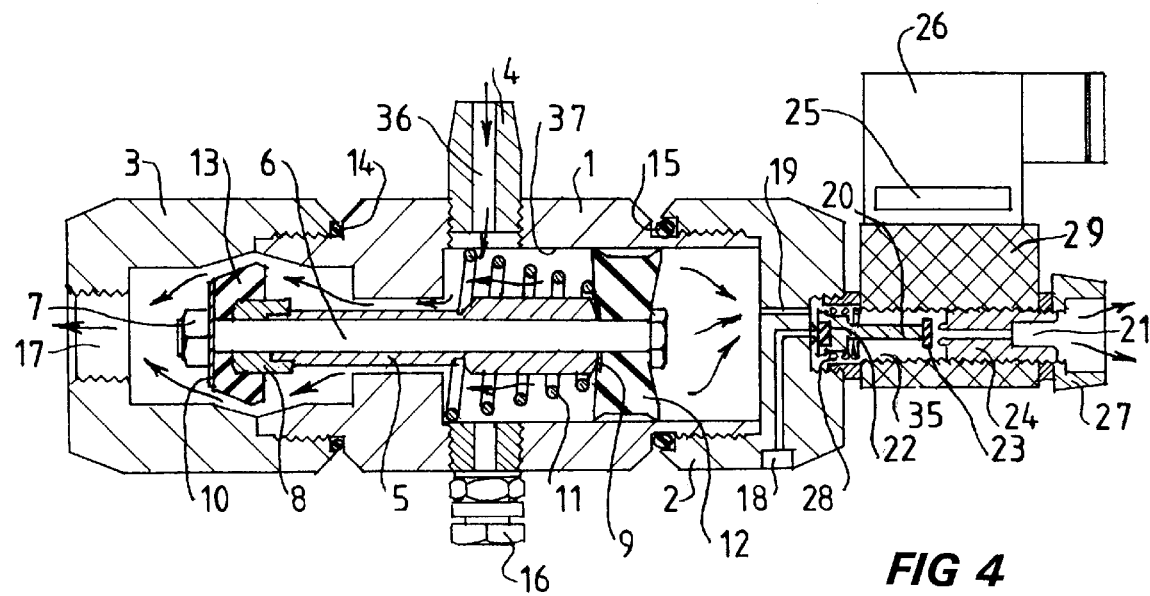
FIG. 4 shows the drain valve of FIG. 1 with the closure reclosed and the piston returning to its first position.

FIG. 4 shows the position shortly after the solenoid has been deactivated by the electronic timer, causing closure 22 to be reclosed and exhaust seal 23 to be opened. Closure 22 cuts off positive air pressure inlet 18, and exhaust port 21 allows air in air communication path 19 to escape, so that piston 12 returns to its first position under the force of biasing means 11. Outlet seal 13 at the same time returns from its second seat to its first seat, and during the transition outlet 17 is open, allowing the expulsion of accumulated liquids and small solids. The drain valve thus returns to the state illustrated in FIG. 1.

The solenoid activation time for each cycle is about 3 seconds, and the interval between solenoid activations may be any suitable period, with about 4 minutes being a suitable period for most applications, although this depends largely upon the particular application and the rate at which liquids and small solids accumulate in accumulation chamber 37.

The solenoid and timer may be powered by any suitable source of electricity. In embodiments of the invention which are used on motor vehicles, it is preferred that the solenoid and timer operate from the vehicle's battery (usually 12 volts or 24 volts D.C.). In embodiments which are used in factories or other fixed locations, it is preferred that the solenoid and timer operate from mains power (usually 240 volts or 110 volts A.C.), possibly via an A.C. to D.C. transformer.

It is to be understood that various alterations, additions and or modifications may be made to the parts previously described without departing from the ambit of the invention.

We claim:

1. A drain valve including:
   (a) a housing;
   (b) an inlet in the housing for liquids and small solids;
   (c) an accumulation chamber in the housing, for accumulating liquids and small solids;
   (d) an outlet, through which liquids and small solids from the accumulation chamber can be expelled;
   (e) a valve seal for the outlet;
   (f) an air activated piston inside the housing movable between a first closed position and a second closed position, and connected to the outlet seal, wherein the outlet seal is closed when the piston is moved to the first closed position and when the piston is moved to the second closed position, but opens when the piston is in an intermediate position between the first and second closed positions;
   (g) a positive air pressure inlet;
   (h) a passageway in the housing between the positive air pressure inlet and a secondary chamber;
   (i) a closure in the secondary chamber for the positive air passageway;
   (j) an air communication path between the secondary chamber and the piston; and
   (k) closure activation means;
   wherein, in operation, liquids and small solids accumulate in the accumulation chamber; the closure activation means opens the closure, causing positive air pressure to flow to the piston which moves from its first closed position to its second closed position and briefly causes the outlet seal to be moved to said intermediate open position as the outlet seal is moved from the first closed position to the second closed position, allowing liquids and small solids from the accumulation chamber to be expelled to the outlet; and upon de-activation by the closure activation means the closure recloses, blocking the supply of positive air pressure to the piston and expelling positive air pressure to the atmosphere, allowing the piston to move from its second closed position to its first closed position, again briefly causing the outlet seal to be moved to said intermediate open position and dislodging any small solids between the outlet seal and the accumulation chamber adjacent said outlet, while at the same time allowing liquids and small solids from the accumulation chamber to be expelled to said outlet.

2. A drain valve according to claim 1 wherein the secondary chamber includes an exhaust port which is open when the positive air passageway is closed, allowing exhausting of air from the piston, and the exhaust port is closed by the closure when the positive air passageway is open, preventing the escape of air from the secondary chamber.

3. A drain valve according to claim 1 wherein the housing may be separated into different parts for cleaning and maintenance.

4. A drain valve according to claim 1 wherein the closure activation means includes a solenoid.

5. A drain valve according to claim 1 wherein a closure biasing means biases the closure towards a closed position.

6. A drain valve according to claim 1 wherein a piston biasing means biases the piston towards its first position.

7. A drain valve according to claim 1 wherein the piston is located within the accumulation chamber.

8. A drain valve according to claim 1 wherein the closure activation means is activated periodically by an electrical signal provided by a timing device.

9. A drain valve according to claim 1 wherein the closure activation means is activated by an electrical signal provided by a vehicle's electrical circuitry whenever the vehicle's brakes are applied.

* * * * *